Dec. 14, 1965 — A. B. STILES — 3,223,653
MANGANO-CHROMIA-MANGANITE CATALYSTS CONTAINING VANADATES
Filed June 9, 1961
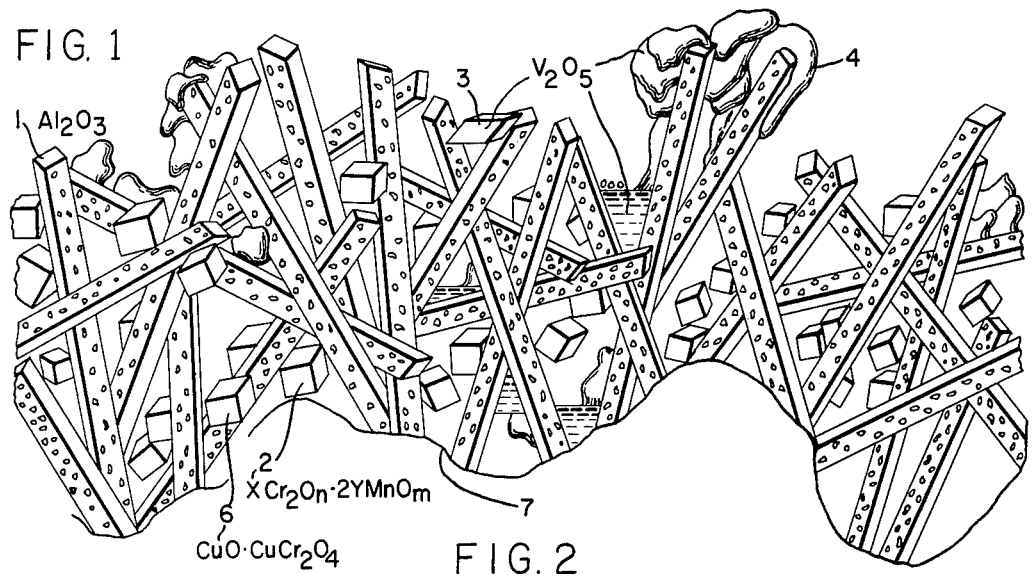
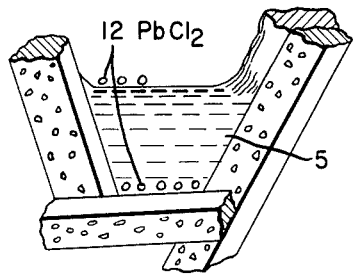
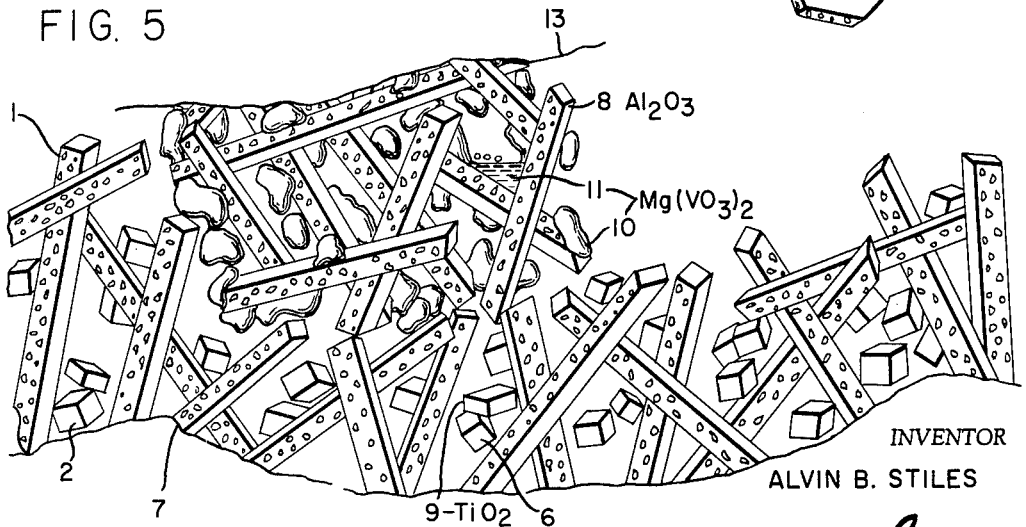
INVENTOR
ALVIN B. STILES
BY Albert B. Griggs
ATTORNEY

United States Patent Office 3,223,653
Patented Dec. 14, 1965

3,223,653
MANGANO-CHROMIA-MANGANITE CATALYSTS CONTAINING VANADATES
Alvin B. Stiles, Charleston, W. Va., assignor to E. I. du Pont de Nemours and Company, Wilmington, Del., a corporation of Delaware
Filed June 9, 1961, Ser. No. 116,082
5 Claims. (Cl. 252—464)

This invention relates to the treatment of automobile exhaust gases which contain such products as nitrogen oxides, carbon monoxide, and hydrocarbons and which additionally contain the products of combustion of alkyl lead anti-knock compounds. The invention is more particularly directed to mangano-chromia-manganite catalysts the particles of which are contiguous to a vanadium compound selected from the group consisting of alkali and alkaline earth metal meta vanadates, aluminum, copper, iron, cobalt, nickel, manganese, cerium, and chromium meta vanadates, and vanadium oxides and to the use of such products for the catalytic oxidation of the components of the combustion of leaded fuels in automobiles.

In the drawings:
FIGURE 1 is an artist's conception of the mode of contiguous association of materials in the catalysts of the invention,
FIGURE 2 illustrates in more detail a section in dotted lines in FIGURE 1 showing what may happen when lead compounds are rendered innocuous in the catalytic systems of the invention,
FIGURE 3 shows monoclinic crystals of alumina, $Al_2O_3$, as pseudohexagonal crystals,
FIGURE 4 shows the copper chromite crystallites in greater detail, and
FIGURE 5 illustrates a modified embodiment of the invention in which discrete particles of a vanadium compound are associated with a mangano-chromia-manganite catalyst.

Mangano - chromia - manganites are described and claimed as catalysts for the treatment of automobile exhaust gases in the following patent applications:

Howk and Stiles, U.S. Ser. No. 109,483, filed May 19, 1961.
Howk and Stiles, U.S. Ser. No. 59,263, filed September 29, 1960.

The mangano-chromia-manganite catalysts as described are exceedingly effective for the treatment of automobile exhaust gases. They are characterized by low temperature light-off, long life, and comparatively low cost. The catalysts work best however with fuel which does not contain much lead and with leaded fuels give good results but the activity of the catalysts falls off during use.

According to the present invention the mangano-chromia-manganite catalysts of the above tabulated cases are protected from the products of combustion of leaded gasolines by the incorporation of a vanadate or vanadium oxide. The addition of such a vanadium compound according to the invention surprisingly not only protects the catalysts against leaded compounds so that they do not lose activity, but at least in early stages, say for the first five to fifteen thousand miles, catalytic activity actually increases as lead is assimilated into the catalyst. The increase in activity is particularly notable for the olefinic and the carbon monoxide components of the exhaust gases.

Before proceeding to a detailed description of the invention, reference should be had to FIGURE 1 for a general description of the catalyst systems of the invention.

In FIGURE 1 there is shown at 1 the alumina of a typical refractory support. This is illustrated as monoclinic crystals of the hydrate. Electronmicrographs of alumina of the type here employed show that these can be more accurately represented as monoclinic crystals which are pseudohexagonal crystals as illustrated in FIGURE 3. It is noted that the holes showing at 1 in FIGURE 1 and at the edges of the hexagonal crystals in FIGURE 3 represent fissures from which water has evolved.

Mangano-chromia-manganite is illustrated at 2 of FIGURE 1 as a cube. A typical vanadium compound according to the invention, vanadium pentoxide, is illustrated as a rhombohedral crystal at 3 and as a shapeless, sintered mass at 4. A co-catalyst, copper chromite, is illustrated as a cubic crystal at 6 and is perhaps more accurately represented in FIGURE 4 in which the CuO is shown as small appended crystallites upon a copper chromite cube.

As will be noted later, it is important that the particles of vanadate or vanadium oxide be associated with the catalyst particles in such a manner as to be contiguous but it is preferred that they not be intermixed as by coprecipitation though this can be done.

In the system as illustrated in FIGURES 1 and 2 there will be seen a pool of the vanadium pentoxide shown at 5. It is believed that the activity of catalysts of the invention in the presence of lead compounds arises from the fact that the vanadate or vanadium oxide becomes molten at temperatures encountered on the catalyst support surface and lead components, illustrated at 12 by $PbCl_2$, gather upon the liquid and then gravitate downward as shown in FIGURE 2. They are thus sequestered with respect to the mangano-chromia-manganite. At the same time there may be some lead vanadate formed which may add activity.

It will be understood that while this explanation of function is believed to account for the data and the facts now available, it may be that some other explanation is equally consistent. It is possible, for example, that the lead compounds of whatever nature are reacted with the vanadate or vanadium oxide without substantial fusion.

THE MANGANO-CHROMIA-MANGANITE CATALYSTS

The mangano-chromia-manganite catalysts to be used according to the invention are described and claimed as such and with co-catalysts, interspersants, and supports in our co-pending applications above mentioned and reference can be had to such applications for further details. A general description should be sufficient here.

The mangano-chromia-manganites have the following empirical chemical composition:

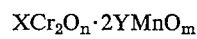

$$XCr_2O_n \cdot 2YMnO_m$$

in which $n$ can be 2, 3, and 6 and $m$ can be 1, 1.33, 1.5, 2, and 2.5. The mn:Cr weight ratio can vary from 3:0.5 to 3:30. The atomic ratio, that of Y:X, is substantially the same and thus when Y equals 3, X can equal 0.5 to 30.

A mangano-chromia-manganite can be prepared having a ratio of Mn:Cr of 3:2 according to methods of Lazier U.S. Patents 1,746,782 and 1,964,001 and Wortz U.S. Patent 2,108,156. In these and other prior suggestions of manganese chromites it is proposed that equimolecular amounts of the manganese compound and the chromium compound be used which in aqueous solutions results in a product having a ratio of 3:2 because a third of the chromium is not precipitated and is washed away.

The mangano-chromia-manganites can be prepared by procedures which are described in detail in the Howk and Stiles applications above mentioned. Generally, it can be said that they are prepared by reacting appropriate salts of manganese and chromium in aqueous solution. Thus manganese nitrate and chromic acid anhydride are dissolved in water and ammonia is added to make a precipitate. The products of high manganese ratio can be prepared by adjusting the amounts of components, but a high chromium product can be made when a hexavalent chromium salt is used as a chromium source only by adding further chromium compound, such as ammonium chromate, to the precipitate thus prepared after filtration. Alternatively the appropriate proportion of suitable salts such as manganese nitrate with chromium nitrate can be precipitated or fused together to give mangano-chromia-manganites of the desired Mn:Cr ratio.

CO-CATALYST

A co-catalyst can be included with the mangano-chromia-manganite and there can be used, for example, such co-catalysts as those described in Patent No. 1,964,001. Thus one of the following can be added as the carbonate or can be added as a basic chromate or oxide:

| | |
|---|---|
| Copper | Cadmium |
| Nickel | Cobalt |
| Zinc | Tin |
| Iron | Bismuth |

The co-catalysts can, of course, be added as other compounds depending upon the specific treatment and processing conditions used.

The weight ratio of co-catalyst: mangano-chromia-manganite can vary greatly and can range from, say, 10:1 to 1:10. About 1:1 is preferred.

INTERSPERSANTS

It is often desirable to add an interspersant to the catalyst aggregate as described in the above mentioned Howk and Stiles applications. The interspersants are refractories which have a melting point above 1000° C. and more preferably above 1600° C. The crystallite size of the refractory should be such that its crystallites keep the crystallites of the mangano-chromia-manganite apart. The refractory crystallites serve a similar function with crystallites of co-catalysts which are present.

The interspersants which can be used include such water-insoluble precipitates as:

(1) Aluminum oxide and hydroxide
(2) Titania
(3) Thoria
(4) Ceria
(5) Chromia
(6) Magnesia
(7) Calcium oxide and hydroxide
(8) Barium oxide and hydroxide
(9) Strontium oxide
(10) Zinc oxide
(11) Manganese oxide
(12) Silica
(13) Beryllia
(14) Zirconia
(15) Lanthana
(16) Hafnia Aluminum hydroxide, which is present as oxide in the final product, is preferred. Manganese oxide and chromia are listed as interspersants to be added in amounts exceeding those which would be present in the mangano-chromia-manganite of the ratios described.

It is to be noted that the interspersants can be added in the first precipitation or formation of the catalyst aggregate and a second interspersant can be added after the catalyst aggregate has been formed and especially after it has been heat-treated or calcined. The interspersants can be heat-decomposable products or they can be introduced in the form of sols or dispersions.

The amount of the interspersants can be widely varied and the total of the first interspersants can run from, say, 5 to 75% based upon the weight of mangano-chromia-manganite plus a co-catalyst if there is one. A second interspersant can range in amount from 0.5 up to 50% or even more by weight of the weight of the catalyst aggregate to which it is added.

Further details of the introduction of co-catalysts and interspersants can be found in the Howk and Stiles applications previously mentioned.

THE VANADIUM COMPOUNDS

According to the present invention the mangano-chromia-manganite catalyst is modified by associating particles of the catalyst in a contiguous relation to the particles of an alkali or alkaline earth metal meta vanadate, aluminum, copper, iron, cobalt, nickel, manganese, cerium, and chromium meta vanadates, or a vanadium oxide.

The vanadium compounds employed in making catalysts of the invention are the alkali meta vanadates:

Ammonium meta vanadate
Lithium meta vanadate
Potassium meta vanadate
Sodium meta vanadate The alkaline earth metal meta vanadates are:

Calcium meta vanadate
Barium meta vanadate
Strontium meta vanadate
Magnesium meta vanadate Metal vanadates which can be used are:

Aluminum meta vanadate
Copper meta vanadate
Iron meta vanadate
Cobalt meta vanadate
Nickel meta vanadate
Manganese meta vanadate
Cerium meta vanadate
Chromium meta vanadate In use or upon calcination preparatory to use the ammonium meta vanadate is converted to vanadium oxides. For purposes of the invention the vanadium oxides can be formed by this mechanism or can be added directly. Thus one can add vanadium oxides:

Vanadium pentoxide
Vanadium tetroxide

The amount of the vanadate or its equivalent, vanadium pentoxide or tetroxide, to use can be widely varied because if too much is used it is merely wasteful and if too little is used the catalyst is still effective but does not obtain the full benefits of the invention. Generally it will be found satisfactory to use a proportion of the vanadium compound to the mangano-chromia-manganite by weight of 10:1 to 0.1:1. The most preferred proportions are nearer the lower end of the range using amounts of vanadium compound to catalyst in the vicinity of 1:1.

The mangano-chromia-manganite and the vanadium compound can be mixed as powders and pilled, tableted or pelleted.

Precipitates of the mangano-chromia-manganite and of the vanadium compound can be separately prepared and then brought together and spray dried.

As will be illustrated in the examples the vanadate can be co-precipitated with the catalyst but this is a less preferred embodiment of the invention.

A contiguous relation between the particles of catalyst and the vanadium compound can best be obtained and a catalyst of high effectiveness and relatively low cost can be made by applying the catalyst and the vanadium compound to a refractory support. First one and then the other can be applied to the support. The mangano-chromia-manganite catalyst can also be formed in situ on the support and so can the vanadium compound as will be illustrated hereinafter.

As shown in FIGURE 5 the vanadium compound can be applied, or mixed, with the mangano-chromia-manganite catalyst as discrete particles or aggregates of a number of vanadate crystallites. Thus a finely ground vanadium compound can be applied to the catalyst. As shown in FIGURE 5 a supported mangano-chromia-manganite catalyst is indicated at 2. A discrete vanadate particle is shown in contact with the catalyst. This is made up of vanadate particles 10 and 11 combined with alumina 8. Other of the supports listed hereafter can likewise be used.

Alternatively there can be used any of a wide variety of materials which are inert and relatively infusible by mixing these with the vanadate. Particles thus can be made which are somewhat less fusible than the vanadate particles themselves. Finely divided silica, silica aerogels, and clays such as bentonite can be used in addition to other finely divided support materials mentioned below.

The discrete particles of vanadate whether as an aggregate or as groups of crystallites can range in size down to the size of a single crystallite or two up to such a size that the particles will not form a stable bond between the catalyst proper and the discrete particle after the moderate calcination to which the catalyst is normally subjected. This size varies somewhat with the melting point of the vanadate, the calcination temperature and other variables but generally the particles should be less than 25 microns in greatest dimension.

In preparing discrete particles of vanadates with suitable supports and inerts the amount of the vanadate can range from 5 up to 100% though for practical reasons it will ordinarily be preferred if using a support to use about 25 to 75% of a vanadate by weight based upon the total weight of the particles.

It will be understood that while reference is made to the catalyst containing the mangano-chromia-manganite and the vanadates as described, there will be oxidation, reduction, and intermittent heating of the catalyst as it is used which will result in some reaction among these components. Thus there will be some resonance between the mangano-chromia-manganite and the vanadates to form more or less of a complex of manganese, chromium, vanadium compounds. With vanadium pentoxide for example there will be some formation of manganese vanadate after heating. There is an even greater tendency for some of the co-catalysts to interact and to form an equilibrium series of compounds. Thus copper or nickel chromites can interact at points of contact to give copper vanadate, nickel vanadate, and the like.

It is further to be observed that the vanadium compounds are themselves somewhat effective as catalysts even though their principal function in the catalyst of the present invention is to make the catalyst resistant to the combustion products of lead anti-knock compounds.

A potassium compound or a sodium compound can be added using a small percentage based upon the weight of the total catalyst in which it is used. It can be added to the catalyst support or as a component of the catalyst or the vanadium compound as desired.

A small amount, say, 1/100 to 10% or more narrowly 1/10 to 5% of a potassium compound such as potassium sulfate, potassium carbonate, potassium bicarbonate, potassium hydroxide, or potassium nitrate and like amounts of the corresponding sodium compound can be used.

SUPPORTS

Supports suitable for use according to the present invention include various refractory bodies customarily used for this purpose in the art. There can be used for example:

(1) Porous ceramic spheres, tablets or rings which have a softening or melting point in excess of 1200° C.
(2) Etched nickel, Nichrome, and Inconel wire
(3) Alundum
(4) Pumice
(5) Diaspore
(6) Bauxite
(7) Periclase
(8) Zirconia
(9) Titania
(10) Diatomaceous earth
(11) Calcium sulfate
(12) Barium oxide
(13) Calcium oxide
(14) Activated alumina granules The preferred refractory supports are:

Bauxite
Zirconia
Titania
Activated alumina

It is preferred that the surface area be at least 10 M²/g. with pore dimensions such that 40% are less than 200 Angstroms. It is even more preferred that the surface area be at least 80 M²/g. with pore dimensions of at least 60% less than 200 Angstroms. Mangano-chromia-manganite catalyst employing such preferred supports are described and claimed in Howk and Stiles U.S. application Serial No. 109,483 filed May 19, 1961. The catalyst support can be washed with water or with weak acids followed by washing with water as covered in a co-pending application of the assignee of the present case, Gilby, U.S. application Serial No. 108,763 filed May 9, 1961.

The amount of catalyst applied to a support can be widely varied in accordance with usual practices but ordinarily will run from 1 to about 20% by weight based upon the weight of refractory. Less catalyst does not ordinarily give adequate activity and more catalyst is wasteful.

The catalyst containing the alkali or alkaline earth metal meta vanadate or vanadium oxide whether tableted or supported as described can be calcined, if desired, at a temperature which does not go so high as to result in sintering of the catalyst components including the vanadate or vanadium compound. Temperature from about 250 to 800° C. will be satisfactory and the times can run from a few minutes up to 30 minutes or an hour. Such calcination will be particularly desirable if there are heat-decomposable components in the catalyst.

In order that the invention may be better understood reference should be had to the following illustrative examples.

Example 1

(1) 250 parts by weight of 4 to 8 mesh activated alumina having a surface area of 80 square meters per gram and having 60% of the pores smaller than 600 A. in diameter is immersed in a solution-slurry comprising 25 parts by weight of ammonium meta vanadate and 5.2 parts by weight of aluminum oxide as the nitrate in 500 parts by weight of water at 90° C.

(2) The granules are allowed to drain free of excess liquid then are calcined at 400° C. for one hour.

(3) The granules are immersed in a solution comprising 5.5 parts by weight of manganese, 6.3 parts by weight of copper and 18.9 parts by weight of chromium all as the nitrates in 500 parts by weight of water at 90° C.

(4) After 15 minutes immersion, the granules are removed and excess liquid drained then they are calcined at 400° C. for one hour.

A catalyst as thus prepared is illustrated in FIGURE 1 of the drawings. The activated alumina serves as the support 1. Upon the support there is distributed the mangano-chromia-manganite catalyst shown as cubes in the drawing at 2. This is formed in situ by reaction of chromium and manganese nitrates in situ upon calcination. The alumina which is added together with the ammonia meta vanadate serves as an interspersant for the mangano-chromia-manganite and since it is indistinguishable in crystalline form from the support it is also represented by the alumina shown at 1 in the drawing. The copper chromite co-catalyst is shown in the drawing at 6 as cubic in form and in FIGURE 4. The ammonium meta vanadate employed according to the invention is converted by calcination to vanadium pentoxide and is illustrated in the drawing as a rhombohedral crystal at 3 but it more often exists in amorphous form as shown at a number of places in the drawing at 4. In operation of the catalyst it is believed that the vanadium pentoxide becomes liquid at especially hot areas as shown at 5 in FIGURE 2.

The catalyst as prepared is effective for treatment of automobile exhaust resulting from burning leaded fuels. These exhaust gases normally contain nitrogen oxides, carbon monoxide, unburned hydrocarbons, and products of combustion of alkyl lead anti-knock agents. Ordinarily there are also halides present with the anti-knock agents. The lead compounds are illustrated in the drawing by $PbCl_2$ but actually include a wide variety of species including such compounds as lead bromides, lead oxyhalides, and various other complex lead compounds. The catalyst effectively converts the carbon monoxide to carbon dioxide and converts the hydrocarbons to carbon dioxide water vapor. The nitrogen oxides are in part reduced to nitrogen. The lead compounds are in part removed but part pass through the catalyst unchanged.

Catalysts can be prepared as shown above replacing the copper co-catalyst with nickel, zinc, iron, cadmium, cobalt, tin, or bismuth or mixtures of these with each other and with copper as their nitrates, chromates, or carbonates using in each instance an amount of metal as shown above. In using the carbonates which are rather insoluble, a dispersion of finely divided powder should be used. Instead of using the metal chromates the basic chromates can similarly be used. These revert in each instance to chromite on calcining as the nitrate and carbonate convert to the oxides. The catalysts thus prepared are effective for treatment of automobile exhaust gases.

*Example 2*

(1) 250 parts by weight of activated alumina of the type used in Example 1 is immersed in a solution-slurry comprising 25 parts by weight of ammonium meta vanadate and 2.4 parts by weight of $Al_2O_3$ as the nitrate in 500 parts by weight of distilled water.

(2) The excess liquid is drained from the granules which are then calcined at 400° C.

(3) The calcined granules are next immersed in an aqueous solution comprising 5.5 parts by weight of manganese, 3.2 parts by weight of copper, 2.9 parts by weight of nickel and 18.9 parts by weight of chromium all as nitrates in 500 parts by weight of distilled water.

(4) The granules are drained to remove excess liquid and then are calcined at 450° C. for one hour.

The catalyst in this example is useful in the abatement of fumes from automotive engines burning leaded gasoline.

*Examples 3 through 7*

An automobile exhaust catalyst is prepared as in Example 2 except that the copper and nickel nitrates are replaced in Item 3 by the below designated metal nitrates:

*Example 3.*—20.9 parts by weight of bismuth, as nitrate.
*Example 4.*—11.3 parts by weight of cadmium, as nitrate.
*Example 5.*—5.9 parts by weight of cobalt, as nitrate.
*Example 6.*—6.5 parts by weight of zinc, as nitrate.
*Example 7.*—11.9 parts by weight of tin, as nitrate.

*Example 8*

A catalyst is prepared as in Example 2 except that in Item 3 the nickel nitrate is replaced with 2.8 parts by weight of iron as the nitrate.

*Example 9*

(1) 250 parts by weight of activated bauxite having surface area of 130 square meters per gram and having pore dimensions such that 75% of the pores are smaller than 600 A. in diameter is immersed in a solution-slurry of 25 parts by weight of ammonium meta vanadate and 5.2 parts by weight of $Al_2O_3$ as the nitrate at 90° C.

(2) The granules are drained to free them of excess liquid and then are calcined at 300° C. for two hours.

(3) The calcined granules are immersed in a solution composed of 5.5 parts by weight of manganese, 13.7 parts by weight of chromium and 5.2 parts by weight of $Al_2O_3$ all as nitrates and 500 parts by weight of water at 80° C.

(4) The impregnated granules are calcined at 300° C. for two hours.

The catalyst as thus prepared is useful for the abatement and oxidation of fumes from automotive exhausts when the engines burned leaded gasoline.

*Examples 10 through 14*

A catalyst suitable for use for treatment of automobile exhaust fumes is prepared as in Example 9 but replacing the bauxite used in Step 1 with an equal weight of the refractory support tabulated below:

*Example 10.*—Silica granules having a surface area of 330 $M^2$/g. and having 50% of the pores less than 400 Angstroms in diameter.

*Example 11.*—Silica-alumina, 88% $SiO_2$–12% $Al_2O_3$, particles having a surface area of 40 $M^2$/g. and pore dimensions such that 50% of the pores are less than 400 Angstroms in diameter.

*Example 12.*—3/16" diameter zirconia spheres having a surface area of 1 $M^2$/g. and having 3% of the pores less than 600 Angstroms.

*Example 13.*—4 to 8 mesh diatomaceous earth having a surface area of 4 $M^2$/g. and having 50% of its pores smaller than 600 Angstroms in diameter.

*Example 14.*—Activated calcium sulfate granules.

*Example 15*

(1) 250 parts by weight of silica-alumina, 88% $SiO_2$–12% $Al_2O_3$, is immersed in a solution-slurry comprising 25 parts by weight of ammonium meta vanadate and 14 parts by weight cerium as nitrate in 500 parts by weight distilled water at 90–95° C.

(2) The excess liquid is drained from the granules and then calcined at 250° C. for two hours.

(3) The granules are next immersed in a solution comprising 5.5 parts by weight of manganese, 3.2 parts by weight of copper, 2.8 parts by weight of iron and 18.9 parts by weight of chromium all as the nitrates in 500 parts by weight of water at 85° C.

(4) The granules after draining are calcined at 400° C.

The catalyst of this example is useful for the abatement of automotive fumes for automotive engines burning leaded gasoline.

*Example 16*

(1) 250 parts by weight of activated alumina of the type in Example 1 is immersed in a solution comprising 10 parts by weight $KVO_3$ at 90° C.

(2) After removing the excess liquid from the granules they are calcined at 200° C. for two hours.

(3) They are next immersed in a solution composed of 5.5 parts by weight of manganese, 5.9 parts by weight of nickel, 18.9 parts by weight of chromium, 13.4 parts by weight of $ThO_2$ all as the nitrates in 500 parts by weight of distilled water.

(4) The granules are drained and finally calcined at 400° C. for two hours. The ratio of mangano-chromia-manganite to potassium meta vanadate is approximate 10:1 in this example.

*Examples 17 through 21*

Catalysts are prepared by the procedure of Example 16 but replacing the thorium oxide with the below indicated amounts in parts by weight of the metal oxides indicated:

*Example 17.*—2.5 beryllium oxide.
*Example 18.*—16 barium oxide.

*Example 19.*—21 hafnium oxide.
*Example 20.*—16 lanthanum oxide.
*Example 21.*—6.2 zirconium oxide.

*Example 22*

(1) 250 parts by weight of activated alumina of the type shown in Example 1 is immersed in a solution-slurry of 25 parts by weight of ammonium meta vanadate and 4.5 parts by weight of calcium as the nitrate in 500 parts by weight of water at 90° C.

(2) The granules are drained then were calcined at 400° C. for one hour.

(3) They are next immersed in a solution comprising 5.5 parts by weight of manganese, 6.3 parts by weight of copper, 18.9 parts by weight of chromium and 5.2 parts by weight of aluminum oxide all as the nitrates in 500 parts by weight of water at 90° C.

(4) After draining excess liquid the granules are calcined at 400° C. for one hour.

(5) The granules are next immersed in a solution containing 1 part by weight of $K_2SO_4$ then are drained and fiinally dried for 16 hours at 150° C.

This catalyst is useful for the oxidation and removal of fumes from automobile exhausts for engnies burning leaded gasoline.

*Examples 23 through 36*

Catalysts are prepared using the procedure of Example 22 but replacing the calcium nitrate with the below indicated parts by weight of the tabulated metal, the metal in each instance being used as the nitrate.

*Example 23.*—1.4 lithium.
*Example 24.*—8.0 potassium.
*Example 25.*—5.0 sodium.
*Example 26.*—13.7 barium.
*Example 27.*—8.7 strontium.
*Example 28.*—2.4 magnesium.
*Example 29.*—2.0 aluminum.
*Example 30.*—6.3 copper.
*Example 31.*—5.5 iron.
*Example 32.*—5.9 cobalt.
*Example 33.*—5.9 nickel.
*Example 34.*—5.5 manganese.
*Example 35.*—10.0 cerium.
*Example 36.*—3.6 chromium.

*Example 37*

(1) A solution is prepared of 16.5 parts by weight of manganese, 2.8 parts by weight cobalt, 3.2 parts by weight copper all as the nitrates and 30 parts by weight $CrO_3$ in 500 parts by weight distilled water at 35 to 40° C.

(2) Aqueous ammonia is added to the solution to effect complete precipitation as indicated by a test of the supernatant liquid.

(3) On the basis of the dry calcined precipitate, 10 parts by weight of magnesium oxide is kneaded with 100 parts by weight as the wet filter cake.

(4) The homogeneous paste is dried and then calcined at 400° C. for one hour. The calcined material is next placed in a kneading machine capable of kneading 113 parts by weight of $NH_4VO_3$ with 20 parts by weight calcined product and 10 parts by weight thorium oxide as the nitrate together with sufficient distilled water to form a homogeneous paste.

(5) The homogeneous paste is dried and calcined at 400° C. for one hour.

(6) The calcined material is then mixed with a pilling lubricant and pilled in pilling machines of the type used in the pharmaceutical industry. The pills formed are ⅛″ x ⅛″ right cylinders. The catalyst can also be used in the form of 4 to 8 mesh granules, for example.

Catalyst so prepared is useful for the oxidation and removal of noxious fumes in automotive engine exhausts when the engines are powered with leaded fuel.

*Examples 38 through 51*

Catalysts are made as in Example 37 except that the thorium oxide used in Step 4 is replaced with the same weight of metal oxides below tabulated as the nitrate except in Examples 50 and 51:

*Example 38.*—Aluminum oxide.
*Example 39.*—Barium oxide.
*Example 40.*—Calcium oxide.
*Example 41.*—Magnesium oxide.
*Example 42.*—Strontium oxide.
*Example 43.*—Beryllium oxide.
*Example 44.*—Cerium oxide.
*Example 45.*—Hafnium oxide.
*Example 46.*—Manganese dioxide.
*Example 47.*—Lanthanum oxide.
*Example 48.*—Zinc oxide.
*Example 49.*—Zirconium oxide.
*Example 50.*—Silica, as a colloidal aqueous dispersion.
*Example 51.*—Titanium dioxide, as a colloidal aqueous dispersion.

*Example 52*

(1) A solution-slurry is prepared comprising 16.5 parts by weight of manganese as the nitrate, 5 parts by weight of $CrO_3$, 20 parts by weight of $Al_2O_3$ as the hydrate in 500 parts by weight of distilled water.

(2) Ammonium hydroxide is added to the solution of Item 1 until precipitation is complete as determined by a test of the supernatant liquid.

(3) The precipitate is filtered, dried then calcined at 400° C. for two hours.

(4) 15 parts by weight of the powder obtained in Item 3 is placed in a kneading machine of the type used in the bakery industry along with 100 parts by weight of magnesium vanadate and sufficient water to form a paste.

(5) After the paste becomes uniform in Operation 4, it is removed from the machine, dried and calcined at 400° C. for two hours.

(6) The powder obtained in Item 5 is mixed with a pilling lubricant and formed into ⅛″ x ⅛″ pills. The weight relationship between the mangano-chromia manganate portion of the catalyst and the magnesium meta vanadate is 1:10.

This catalyst is useful for the oxidation and abatement of noxious fumes in automotive exhausts from engines fuel with leaded gasoline.

*Example 53*

(1) 30 parts by weight of Inconel as 0.01 inch diameter x 1″ long filaments is etched by immersion in a molten bath consisting of 200 parts by weight of potassium nitrate and 400 parts by weight of potassium hydroxide at 450° C. for one hour.

(2) The etched Inconel from Item 1 is washed with sufficient water to remove the alkali.

(3) The etched Inconel is next immersed in a molten bath comprising 163 parts by weight of $NH_4VO_3$ plus 125 parts by weight of $Al(NO_3)_3 9H_2O$ at 130° C.

(4) After 10 minutes the Inconel is removed from the molten bath and then is calcined at 400° C. for one hour.

(5) The impregnated Inconel is next immersed in a molten bath consisting of 275 parts by weight of manganese, 104 parts by weight of aluminum oxide both as the nitrates and 260 parts by weight of chromium also as the nitrate at 150° C.

(6) After a 10-minute exposure to the molten salts the Inconel wires are removed and then calcined at 400° C. for one hour.

The catalyst of this example is useful for the abatement of automobile fumes for engines fuel with leaded gasoline.

*Example 54*

(1) 250 parts by weight of 4 to 8 mesh bauxite is placed in a pill coating device of the type used in the pharmaceutical industry. The granules are sprayed with a solution-slurry consisting of 2.75 parts by weight manganese as manganese carbonate and 26.0 parts by weight of chromium as $CrO_3$ together with 10.4 parts by weight $Al_2O_3$ as the nitrate. In the course of the coating the salts are deposited on the bauxite and the water vaporized.

(2) The coated granules are calcined at 400° C. for one hour.

(3) The calcined granules are given a second coating in the pill coating device by spraying a solution comprising 40 parts by weight of mangnesium vanadate onto the granules.

(4) The coated granules from Item 3 are calcined at 400° C. for one hour.

This catalyst is useful for the abatement of noxious fumes from automotive engines fueled with leaded gasoline.

*Example 55*

(1) A solution-slurry is prepared of 16.5 parts by weight of manganese, 3.2 parts by weight of copper both as the nitrates, 30 parts by weight of $CrO_3$, and 16.5 parts by weight of separately prepared barium meta vanadate (prepared by adding an aqueous solution containing 13.1 parts by weight of $Ba(NO_3)_2$ to a solution at 90° C. containing 11.6 parts by weight of $NH_4VO_3$) in 500 parts by weight of distilled water in which is also slurried 20 parts by weight of titanium dioxide, pigment grade.

(2) The solution is heated to 30° C. and sufficient ammonium hydroxide is added to completely precipitate the manganese, chromium, copper and barium meta vanadate along with the titania. Completeness of precipitation is determined by examining a sample of the filtrate to determine that no further precipitate is formed when more ammonia is added.

(3) The precipitate is filtered, dried and calcined for two hours at 400° C.

(4) 100 parts by weight of the powder obtained from Item 3 is kneaded with a slurry-solution of 15 parts by weight of aluminum nitrate in sufficient water to make a thick paste with the dry powder.

(5) The uniformly kneaded paste is dried, calcined at 400° C. for one hour, then is either crushed and screened to use in granular form or is extruded and cut into cylinders approximately 1/8" x 1/8" or pilled in a pharmaceutical-type pilling machine to right cylinders approximately 1/8" x 1/8".

(6) The granules, pills or pellets as obtained in Item 5 are finally calcined in air at 450° C. for two hours.

The catalyst as prepared is suitable for the abatement of automobile exhaust fumes when leaded gasoline is used.

*Example 56*

A catalyst in which the meta vanadate is present as discrete particles can be prepared as follows:

SUPPORTED CATALYST PREPARATION (1) 250 parts by weight of 4–8 mesh activated alumina is immersed in a solution-slurry of 16.5 parts by weight of manganese, 6.3 parts by weight of copper, both as the nitrate, plus 30 parts by weight of $CrO_3$ and 4 parts by weight titanium dioxide as a colloidal aqueous dispersion, all in 500 parts by weight of water at 90° C.

(2) The granules after mild agitation in the liquid for 15 minutes are allowed to drain and are dried.

PREPARATION OF DISCRETE META VANADATE PARTICLES (3) 500 parts by weight of alumina hydrate, of particle size such that 100% is in the range 5 to 25 microns (as determined by eleutriation) is placed in a heated and rotated vessel.

(4) A slurry-solution containing 100 parts by weight of magnesium meta vanadate is sprayed onto the alumina hydrate and dried.

(5) 250 parts by weight of the supported catalyst is mixed with 50 parts by weight of the discrete meta vanadate particles. These are tumbled together in a heated atmosphere at 300° C. for about 30 minutes.

The products as thus prepared are suitable for use as a catalyst for treatment of leaded automobile exhaust gases.

Instead of using alumina hydrate as shown there can instead be used fibrous alumina monohydrate having the boehmite crystal lattice, pumice, diatomaceous earth, finely divided silica or silica aerogels, or other of the supports listed above in like amounts by weight with the vanadate shown above or with other of the vanadates shown in this application to form discrete particles having a size not greater than 25 microns.

The catalyst as prepared in the example above using alumina as a support for both the mangano-chromia-manganite and the vanadate is shown in FIGURE 5 of the drawing. The surface of the support is shown at 7 and like materials in FIGURES 1 and 5 are designated by like numerals. In the catalysts of FIGURE 5, titanium dioxide is shown at 9 as an interspersant in the form of tetragonal crytsals.

In FIGURE 5, 10 and 11 refer to magnesium vanadate. A portion of one discrete particle is shown which is broken at 13 and the remainder of the particle is illustrated as being in contact with the catalyst surface. The portion of the particle shown represents alumina hydrate at 8 and is illustrated further in FIGURE 3. As illustrated in the drawing there is some sintering and attachment between the discrete particle and the outer surface of the catalyst.

The claims are:

1. As a catalyst for the treatment of combustion gases which contain such products as nitrogen oxides, carbon monoxide, and hydrocarbons and which additionally contain a lead compound; mangano-chromia-manganite having the empirical formula:

$$XCr_2O_n \cdot 2YMnO_m$$

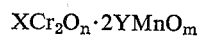

where the ratio of Y:X=3:0.5 to 3:30; n=2, 3 and 6; and m=1, 1.33, 1.5, 2 and 2.5, together with a vanadium compound selected from the group consisting of alkali metal and alkaline earth metal meta vanadates and aluminum, copper, iron, cobalt, nickel, manganese, cerium and chrominum meta vanadates, the proportion of the vanadium compound to the mangano-chromia-manganite by weight being 10:1 to 0.1:1.

2. As a catalyst for the treatment of combustion gases which contain such products as nitrogen oxides, carbon monoxide, and hydrocarbons and which additionally contain a lead compound; mangano-chromia-manganite having the empirical formula:

$$XCr_2O_n \cdot 2YMnO_m$$

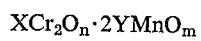

where the ratio of Y:X=3:0.5 to 3:30; n=2, 3 and 6; and m=1, 1.33, 1.5, 2 and 2.5, supported upon a refractory upon which there is also supported a vanadium compound selected from the group consisting of alkali metal and alkaline earth metal meta vanadates and aluminum, copper, iron, cobalt, nickel, manganese, cerium and chromium meta vanadates, the proportion of the vanadium compound to the mangano-chromia-manganite by weight being 10:1 to 0.1:1 and the amount of mangano-chromia-manganite being 1 to 20% by weight of the refractory.

3. As a catalyst for the treatment of combustion gases which contain such products as nitrogen oxides, carbon monoxide, and hydrocarbons and which additionally contain a lead compound; mangano-chromia-manganite having the empirical formula:

$$XCr_2O_n \cdot 2YMnO_m$$

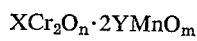

where the ratio of Y:X=3:0.5 to 3:30; n=2, 3 and 6; and m=1, 1.33, 1.5, 2 and 2.5, supported upon a refractory selected from the group consisting of bauxite and alumina, the surface area of which is at least 10 M²/g. and the pore dimensions are such that 40% are less than 200 Angstroms and upon which there is also supported a vanadium compound selected from the group consisting of alkali metal and alkaline earth metal meta vanadates and aluminum, copper, iron, cobalt, nickel, manganese, cerium and chromium meta vanadates, the proportion of the vanadium compound to the mangano-chromia-manganite by weight being 10:1 to 0.1:1 and the amount of mangano-chromia-manganite being 1 to 20% by weight of the refractory.

4. As a catalyst for the treatment of combustion gases which contain such products as nitrogen oxides, carbon monoxide, and hydrocarbons and which additionally contain a lead compound; mangano-chromia-manganite having the empirical formula:

$$XCr_2O_n \cdot 2YMnO_m$$

where the ratio of Y:X=3:0.5 to 3:30; $n=2$, 3 and 6; and $m=1$, 1.33, 1.5, 2 and 2.5, a co-catalyst selected from the group consisting of chromites of copper, nickel, iron, zinc, cadmium, cobalt, tin, and bismuth, the mangano-chromia-manganite catalyst and co-catalyst being used together with a vanadium compound selected from the group consisting of alkali metal and alkaline earth metal meta vanadates and aluminum, copper, iron, cobalt, nickel, manganese, cerium and chromium meta vanadates, the proportion of the vanadium compound to the mangano-chromia-manganite by weight being 10:1 to 0.1:1 and the weight ratio of the said chromites to the mangano-chromia-manganite is from 10:1 to 1:10.

5. As a catalyst for the treatment of combustion gases which contain such products as nitrogen oxides, carbon monoxide, and hydrocarbons and which additionally contain a lead compound; mangano-chromia-manganite having the empirical formula:

$$XCr_2O_n \cdot 2YMnO_m$$

where the ratio of Y:X=3:0.5 to 3:30; $n=2$, 3 and 6; and $m=1$, 1.33, 1.5, 2 and 2.5, containing an interspersant of similar crystallite size and selected from the group consisting of oxides of aluminum, titanium, chromium, magnesium, barium, calcium, and strontium, the catalysts and interspersant being used together with a vanadium compound selected from the group consisting of alkali metal and alkaline earth metal meta vanadates and aluminum, copper, iron, cobalt, nickel, manganese, cerium and chromium meta vanadates, the proportion of the vanadium compound to the mangano-chromia-manganite by weight being 10:1 to 0.1:1 there being 5 to 75% of said oxides based on the weight of mangano-chromia-manganite.

References Cited by the Examiner
UNITED STATES PATENTS

| | | | |
|---|---|---|---|
| 1,934,795 | 11/1933 | Frazer | 23—2.2 |
| 1,939,708 | 12/1933 | Larson | 252—471 |
| 1,995,274 | 3/1935 | Eversole | 252—465 X |
| 2,025,140 | 12/1935 | Wenzel | 252—471 X |
| 2,031,475 | 2/1936 | Frazer | 23—2.2 |
| 2,071,119 | 2/1937 | Harger | 23—2.2 |
| 2,588,260 | 3/1952 | Lynch et al. | 252—471 |
| 2,942,933 | 6/1960 | Batchelder et al. | 23—2.2 |
| 3,025,132 | 3/1962 | Innes | 23—2 |
| 3,067,002 | 12/1962 | Reid | 23—2 |

MAURICE A. BRINDISI, *Primary Examiner.*

JULIUS GREENWALD, *Examiner.*